United States Patent [19]

Kimoto et al.

[11] 4,121,355
[45] Oct. 24, 1978

[54] LEARNING DEVICE

[75] Inventors: Chisaburo Kimoto; Katsuhiko Itasaka; Ryu Tanaka; Yoshinobu Kimura, all of Tokyo, Japan

[73] Assignee: Gakken Co., Ltd., Tokyo, Japan

[21] Appl. No.: 774,584

[22] Filed: Mar. 7, 1977

[30] Foreign Application Priority Data

Mar. 10, 1976 [JP] Japan .............................. 51-28329[U]
Apr. 16, 1976 [JP] Japan .............................. 51-47480[U]

[51] Int. Cl.² .............................................. G09B 7/06
[52] U.S. Cl. ...................................... 35/9 C; 35/8 A; 35/35 C
[58] Field of Search ................ 35/9 B, 9 C, 9 D, 8 A, 35/35 C

[56] References Cited

U.S. PATENT DOCUMENTS 3,057,082  10/1962  Wellington et al. ................... 35/9 C

FOREIGN PATENT DOCUMENTS 114,851  8/1977  Japan ......................................... 35/9 C Primary Examiner—William H. Grieb
Attorney, Agent, or Firm—Irving M. Weiner

[57] ABSTRACT

A learning device includes a learning sheet having for each question a set of answers, only one of which is the correct answer. The sheet is mounted on a base plate having a series of conducting bands which are tortuous or undulating so that the correct answers corresponding to the appropriate associated conducting bands will not be arranged in a straight line nor made obvious to the person using the learning device.

13 Claims, 9 Drawing Figures

LEARNING DEVICE

The present invention relates generally to learning devices.

More particularly, the invention relates to a learning device wherein a learning sheet, on which a plurality of answers consisting of a right answer and wrong answers mixed together to a set question are prepared, is provided and is mounted on a base plate on which predetermined conducting bands of a learning reactor are arranged. Whether an answer selected, with an answer indicating bar having a conducting portion, from among the plurality of answers is a right or wrong answer may be electrically indicated. A recorded sound reproducer is also used for such set question and answers.

BACKGROUND OF THE INVENTION

Heretofore, it has been suggested to use a learning device consisting of a combination of a learning sheet, learning reactor, and answer indicating bar. A base plate is made by arranging one common conducting band and separate single conducting bands set through slight clearances respectively to the right and left of it linearly in a series over a plurality of streaks by a printed wiring technique on an insulating plate. A right answer insulating part is formed between the common conducting band and one single conducting band. A wrong answer insulating part is formed between the common conducting band and the other single conducting band, so that respectively different indications may be made in the respective insulating parts. A plurality of answer holes are formed on the learning sheet mounted on the base plate so that only one answer hole representing a right answer is present in the right answer insulating part, and a plurality of answer holes representing wrong answers are present in the wrong answer insulating part. The answer hole considered to be the right answer to the set question is selected from among the answer holes. The conducting bands present in this answer hole are short-circuited by contacting the conductor of the answer indicating bar with this selected answer hole. An electric indication, i.e., the lighting of an indicating lamp, as to whether the selected answer is right or wrong is made. In the case of the right answer, a blue lamp is continuously lighted. In the case of the wrong answer, a red lamp is intermittently lighted. Or a buzzer is sounded continuously in the case of the right answer, and intermittently in the case of the wrong answer.

However, in this suggested learning device, the respective conducting bands arranged on the base plate of the learning reactor or the respective insulating parts of the right answer and wrong answers are formed in straight lines and are exposed out of the answer holes on the learning sheet. Therefore, the learner is likely to memorize the arranged patterns of the conducting bands. Because the respective answer holes to two or more set questions on one straight line all show the same reaction indications, even if the set question is not understood, the right answer may be selected and this negates objective learning.

Because the answer hole on the learning sheet is selected and the respective hole on the conducting bands are short-circuited by the contact of the conducting parts through this answer hole, the learning sheet itself is not likely to be damaged and there is an advantage in that the learning sheet can be repeatedly used. However, because the answer is obtained by the short-circuiting input between the conducting bands by the conductor of an answer indicating bar, it is necessary to use a conductive metal member for the conductor and to positively contact the conducting bands. To short-circuit the conducting bands adjacent to each other, this conductor must be contacted at a specific angle. When this angle is inclined even slightly, the contact will be faulty and no answer input will be attained. Particularly, as such learning device is to be used mostly by young school age children, the operation will be rather rough, the defects will be conspicuous, no proper answer indication will be obtained, and the right and wrong answers will be indicated by mistake.

Further, in order to use this kind of learning device, e.g., for learning a foreign language, this learning device includes a sight teaching material connected together with a tape recorder as a hearing teaching material. Heretofore, the sight learning with the learning reactor and learning sheet, and the hearing learning with the recorded sound reproduction of the tape recorder, have been used separately. Therefore, the thinking time on the part of the learner, and the timing of the set question and others, are all determined directly by the driving manner of the tape. Not only is this an inconvenience in that the individual difference of each learner cannot be inserted into the operation, but also, in the case of a set question requiring thought time, it will be necessary to stop the drive of the tape each time by a manual operation, or to adopt such means as of leaving a blank corresponding to the thinking time on the tape after setting the question. Stopping the drive of the tape each time is a useless complication to the learner, and will prevent the learner from concentrating solely on the learning. Providing blanks on the tape results in tape loss. Further, when replacing the learning sheet, the tape drive controlling operation will be forced on the learner and, as a result, will be likely to obstruct the learning.

SUMMARY OF THE INVENTION

The present invention effectively solves the above-mentioned problems.

The present invention provides a learning device which includes a learning reactor having a plurality of conducting bands arranged on a base plate. A right answer insulating part and a wrong answer insulating part are formed between associated bands of the conducting bands. A learning sheet is positioned and mounted on the base plate, and has thereon a plurality of answer holes provided for each set question to be presented, so that a right answer corresponds to the right answer insulating part, and a wrong answer corresponds to the wrong answer insulating part. An answer indicating bar is provided with a conductor for short-circuiting a selected one of the insulating parts through a selected answer hole. The plurality of conducting bands is tortuous and continued in a series so that the patterns arranged thereby are camouflaged.

An object of the invention is to obtain a learning device wherein arranged patterns of conducting bands provided on a base plate of a learning reactor cannot be detected and memorized readily by the learner.

Another object is to obtain a learning device wherein a conductor of an answer indicating bar short-circuiting conducting bands through an answer hole on a learning sheet can positively give an answer input irrespective of its contact posture.

According to the invention, the learning device includes a learning reactor and a learning sheet. A plurality of conducting bands, provided on a base plate of the learning reactor and forming respective right answer and wrong answer insulating parts between them adjacent to each other, are formed into patterns arranged as zigzagged, waved, bent, and continued in a series so as to be camouflaged. An answer indicating bar is provided with a conductor made of a flexible and elastic conductive material so that the conducting bands present in respective answer holes on the learning sheet may be short-circuited by this conductor regardless of the contact posture.

Another object is to obtain a learning device wherein a hearing teaching material with a tape recorder is combined with a sight teaching material with a learning reactor and learning sheet. Control of the hearing teaching material from the sight teaching material side, or control of the sight teaching material from the hearing teaching material, i.e., the cooperative connecting operation between both teaching materials, is readily made.

According to an embodiment of the invention, a learning sheet forming a sight teaching material is provided with specified controlling holes. A tape recorder, forming a hearing teaching material, can be controlled by a selecting operation with an answer indicating bar, or by a controlling signal each time of setting one question or presenting one teaching course is given to a tape of the tape recorder. Thus, the drive of the tape recorder may be controlled by this controlling signal and the learning manner with the sight teaching material may be controlled to be made as indicated.

Another object is to provide a learning device wherein, at each set question and each teaching course presented from a tape recorder, the learner can continue learning by freely setting a thinking time for this set question or teaching course in conformity with his own learning speed and progress.

A further object is to provide a learning device wherein, at each set question and each teaching course presented from a tape recorder, the thinking time for the set question and teaching course is limited and is applied to the learner so that answering within the limited time may be made obligatory.

Another object is to obtain a learning device wherein, in the case of learning a foreign language, the pronunciation can be freely practiced by using a learning sheet as a sight teaching material, and using a typical pronunciation obtained from a tape recorder as a hearing teaching material.

A further object is to obtain a learning device wherein the learning result can be marked and indicated.

DETAILED DESCRIPTION

Figure 1:
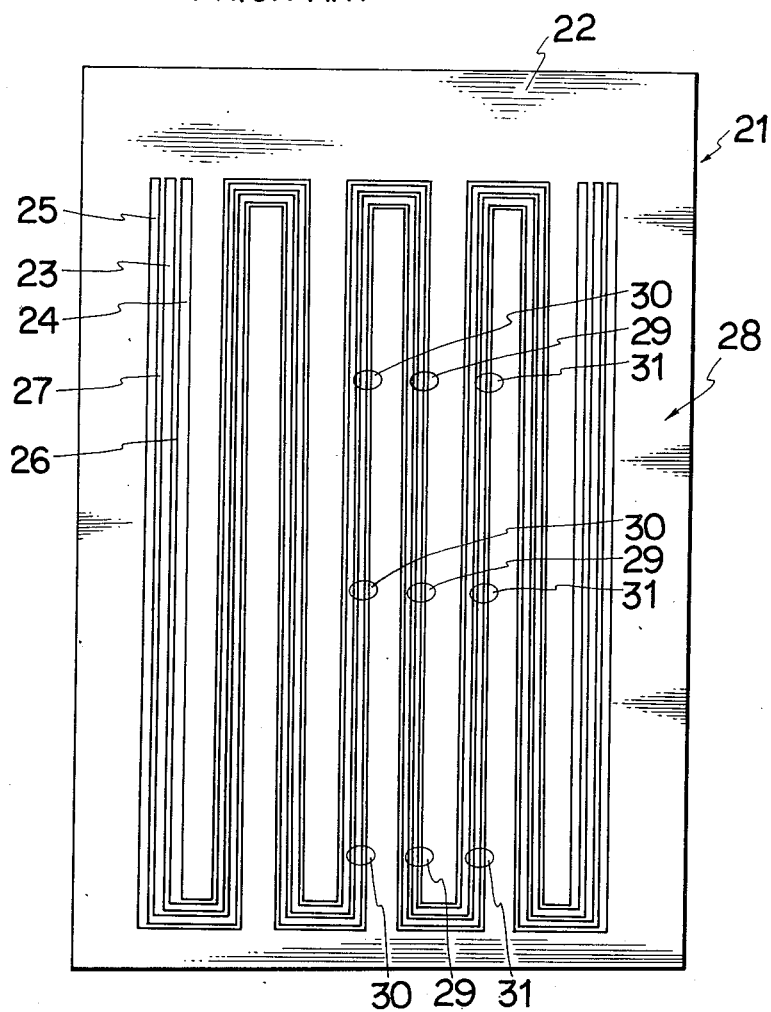
FIG. 1 is a plan view showing the formation of a base plate of a prior suggested learning device.

A base plate of the prior suggested learning reactor is shown in FIG. 1. On base plate 21, one common conducting band 23 and separate single conducting bands 25 and 24 spaced by small clearances to the right and left of common band 23 are arranged in straight line paths on an insulating plate 22. The bands are turned at the upper and lower ends in the vertical direction on the plate surface, and continued in a series over the entire surface. A right answer insulating part 26 is formed between bands 23 and 24. A wrong answer insulating part 27 is formed between bands 23 and 25.

Band 23 is connected to the positive side of a direct current source (not shown). Band 24 is connected to the negative side of the direct current source through a blue indicating lamp indicating a right answer and a buzzer (not shown). Band 25 is connected to the negative side of the direct current source through a red indicating lamp, buzzer and interrupter (not shown), indicating a wrong answer. On a learning sheet 28 to be mounted on base plate 21, only one answer hole 29 representing a right answer is made to bridge bands 23 and 24, i.e., to be present in the right answer insulating part 26. A plurality of answer holes 30 and 31 representing wrong answers are to bridge bands 23 and 25, i.e., to be present in the wrong answer insulating part 27. Answer holes 29, 30 and 31 are formed for each set question.

In the learning device with the learning reactor having plate 21 and learning sheet 28, an answer indicating bar provided with a conductor at its tip is used. An answer hole thought to be a right answer to a set question is selected. When the conductor of the answer indicating bar is contacted with the bands beneath such answer hole, if the selected answer hole is the answer hole 29 of the right answer, then the right answer insulating part 26, i.e., the conducting bands 23 and 24, will be short-circuited. An indication by the continuous lighting of the blue indicating lamp and the continuous sounding of the buzzer will be made. If the answer hole 30 or 31 of the wrong answer is selected, the wrong answer insulating part 27, i.e., the conducting bands 23 and 25, will be short-circuited. An indication by the intermittent lighting of the red lamp and the intermittent sounding of the buzzer will be made.

On plate 21, the conducting bands 23, 24 and 25 are arranged in straight lines. Therefore, the respective answer holes 29, 30 and 31 on any straight line for each set question formed on the learning sheet 28 will give only the same reaction indication. Therefore, even if the set question is not understood, a right answer hole will be able to be easily selected from among the plurality of answer holes, and the value of the learning device will be lost.

Figure 2:
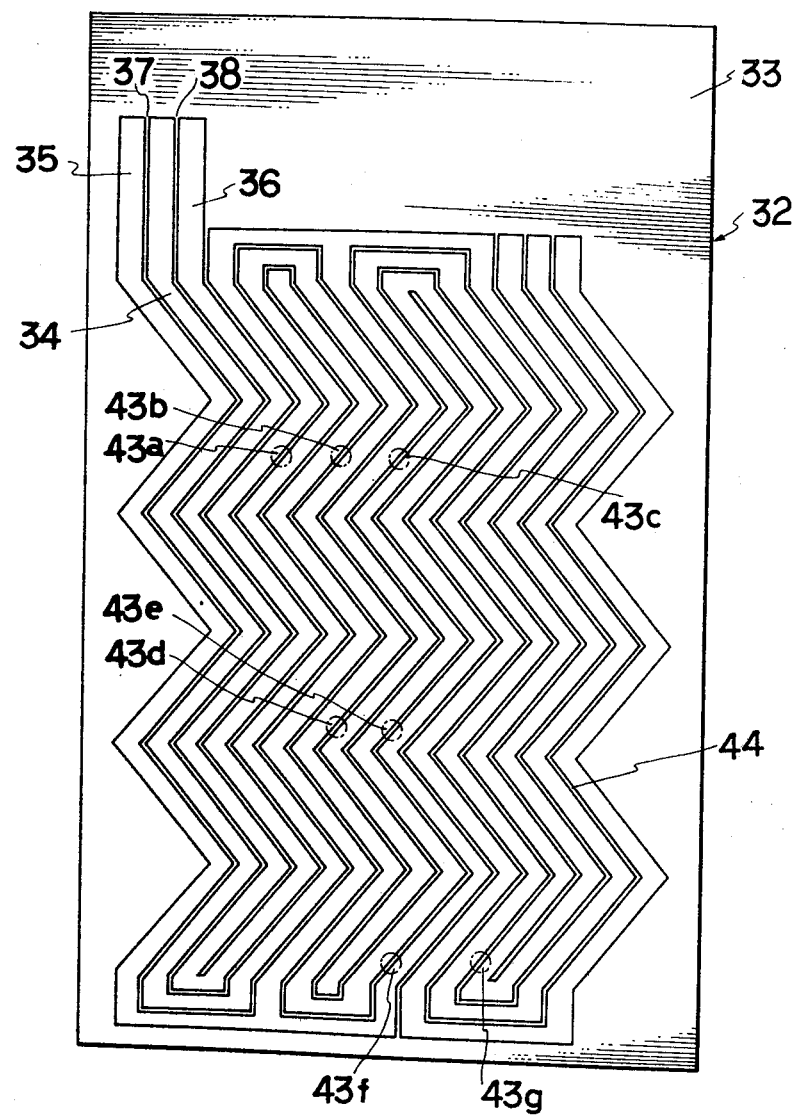
FIG. 2 is a plan view showing the formation according to an embodiment of a base plate in a learning device according to the invention.

The present invention includes a base plate wherein the above-mentioned defect is avoided. On the base plate according to the present invention, the respective conducting bands are tortuous, undlated, or zigzag bent in a series to be continued arranged patterns. An embodiment of such base plate is shown in FIG. 2.

A base plate 32 of a learning reactor according to this embodiment has a common conducting band 34 and single conducting bands 35 and 36 on an insulating plate 33 in the same manner as base plate 21, but bands 34, 35 and 36 are not made in single straight lines in the vertical direction (or in the horizontal direction) of the plate surface. Instead, they are continuously arranged zigzag in a series to form right answer and wrong answer insulating parts 37 and 38, respectively.

Figure 3:
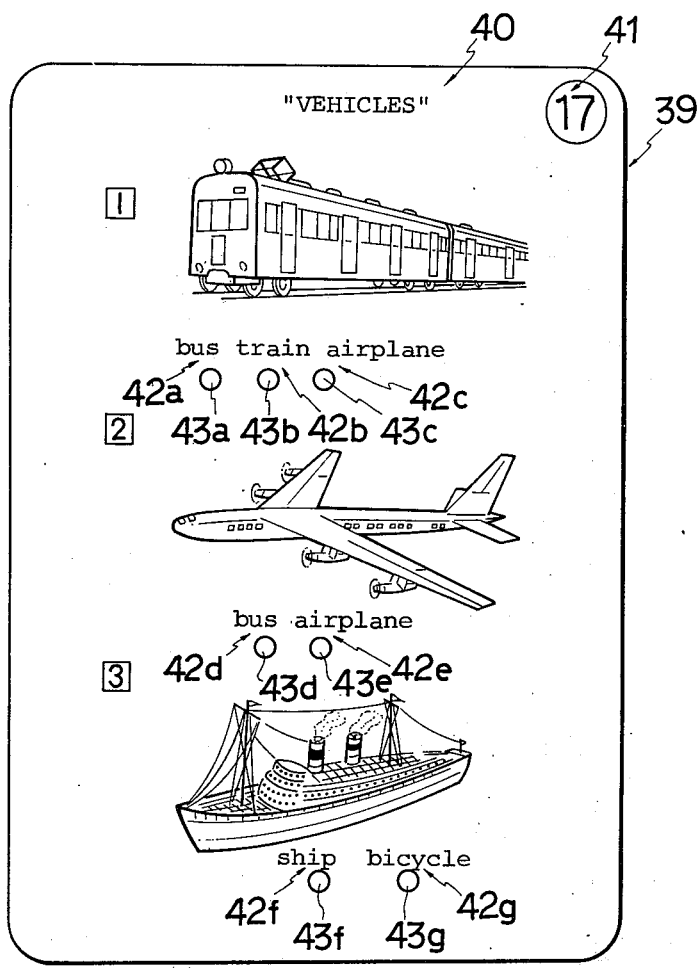
FIG. 3 is a plan view showing the formation according to an embodiment of a learning sheet of the invention.

FIG. 3 shows an example of a learning sheet 39 to be mounted on plate 32. On sheet 39, a title 40, representing generally the content of the learning lesson, and a series number 41 are indicated in the upper part, and three questions relating to title 40 are set vertically (or horizontally).

As indicated by title 40, the set questions ask the name of a picture of a vehicle. The question No. 1 picture is a "train", the question No. 2 picture is an "airplane" and the question No. 3 picture is a "ship". A plurality of answer examples and answer holes corresponding respectively to them are provided below each picture for each set question. The right answer to question No. 1 is "train", but "bus" 42a, "train" 42b, and "airplane" 42c are mentioned as answer examples in the mentioned order from the left. Answer holes 43a, 43b and 43c corresponding respectively to them are formed. For questions Nos. 2 and 3, answer examples 42d to 42g are mentioned, and respective answer holes 43d to 43g are formed. Answer example mentioning positions and answer hole forming positions are made to be present in the respective right answer and wrong answer insulating parts 37 and 38 of plate 32 depending on the right and wrong answers on the basis of the answer hole forming positions.

The positions in which answer holes 43a to 43g will be located when the learning sheet is mounted on plate 32 are shown in phantom line in FIG. 2. On sheet 39, though answer hole 43b to question No. 1 and answer hole 43d to question No. 2 are positioned on a straight line in the vertical direction, answer hole 43b will be present in right answer insulating part 37, answer hole 43d wll be present in wrong answer insulating part 38, and thus the same reaction will not always occur in the respective answer holes on the same straight vertical line. Similarly, though answer holes 43c, 43e and 43f are also on the same straight line, answer holes 43e and 43f will represent right answers and answer hole 43c will represent a wrong answer.

On plate 32, the arranged patterns of the respective conducting bands 34, 35 and 36 are continued zigzag in a series, and present complicated continued repeated patterns which cannot be easily identified as a whole. Even if one conducting band is to be traced by sight, it will be so difficult to trace as to be unable to be memorized. Even if the conducting bands are exposed on the surface of the base plate, the scheme in the relative positions of the respective conducting parts and answer holes will not be detected, and proper learning will be effectively continued. Also, this means that a selective answer input may be obtained in any position on the base plate. Thus, there is an advantage in an increased freedom to arrange set questions on the learning sheet.

Conducting bands 34, 35 and 36 are shown to have straight line segment paths in the bending portions, but need not be limited to such forms. For example, they may be curved in the bending portions. The zigzag form should be interpreted widely to include a kind of wave form.

On the base plate, a blank part will be made on the periphery, particularly in the right and left parts in FIG. 2. It is effective also to arrange a zigzag conducting band 44 through which substantially no current will be passed in this blank part to further camouflage.

Figure 4:
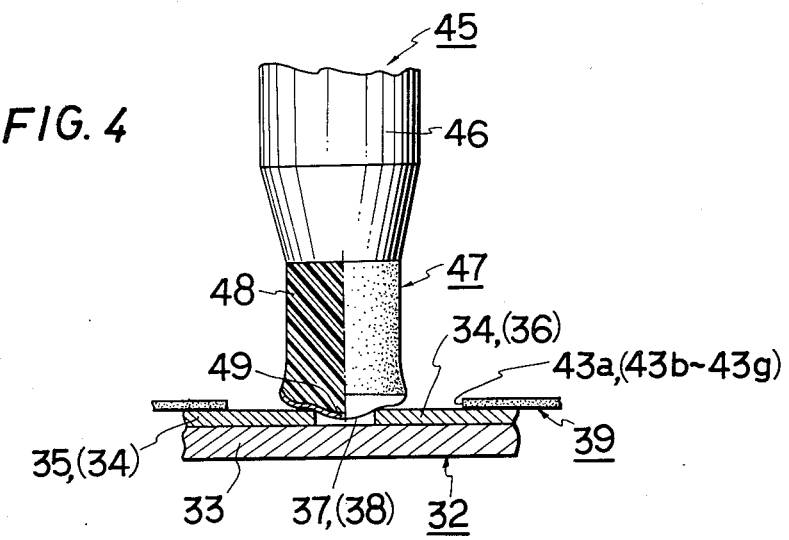
FIGS. 4 and 5 are partly sectioned views showing alternate embodiments of answer indicating bars of the invention.
Figure 5:
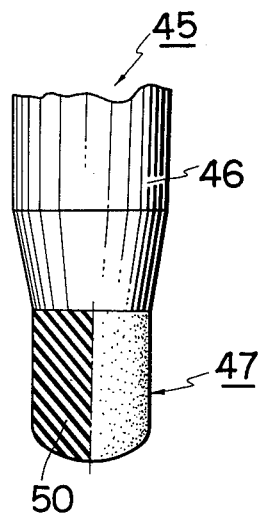

The invention also includes an answer indicating bar to be used to short-circuit parts 37 and 38 through answer holes 43. In the answer bar, a conductor to contact and short-circuit bands 34 and 35 or 34 and 36 forming the respective insulating parts 37 and 38 is formed of a flexible and elastic conductive material. Different embodiments of the answer indicating bars are shown in FIGS. 4 and 5.

An answer indicating bar 45 is provided with a conductive member 47 at the tip of a penholder 46 having a diameter and length suitable for holding by a user. In FIG. 4, a supporting piece 48, made of a rubber or soft synthetic resin, is made a mother material and a conducting layer 49 is formed by chemical plating on the tip surface of the mother material to form the conductive member 47. In FIG. 5, conductive member 47 is formed of a conducting piece 50 of a rubber or soft synthetic resin made to contain carbon. In each embodiment, member 47 is formed to be flexible and elastic.

When member 47 is inserted through a hole 43 on the learning sheet 39 to contact and short-circuit bands 34 and 35 or 34 and 36 on plate 32, an answer input is effectively made. As shown in FIG. 4, the member 47 which is flexible and elastic will partly flex to closely contact, short-circuit, and connect the respective conducting bands. Even if bar 45 is inclined or the contact pressure varies, a positive answer input will be attained. Due to such close contact, the contact area is so large as to keep the contact resistance low. Due to the flexibility and elasticity, the conducting band surface will not be damaged. Due to proper frictional force at the time of the contact, no slip is likely to be produced at the time of the operation and, even with a rough operation, a proper input will be made and thus the functioning and reliability of the device is improved.

Further, the invention includes a learning device wherein a hearing learning with a tape recorder is combined with the sight learning consisting of the learning reactor having plate 32 and learning sheet 39. In this embodiment, the hearing learning obtained with the tape recorder is operatively connected with the sight learning having the learning reactor and learning sheet.

Figure 6:
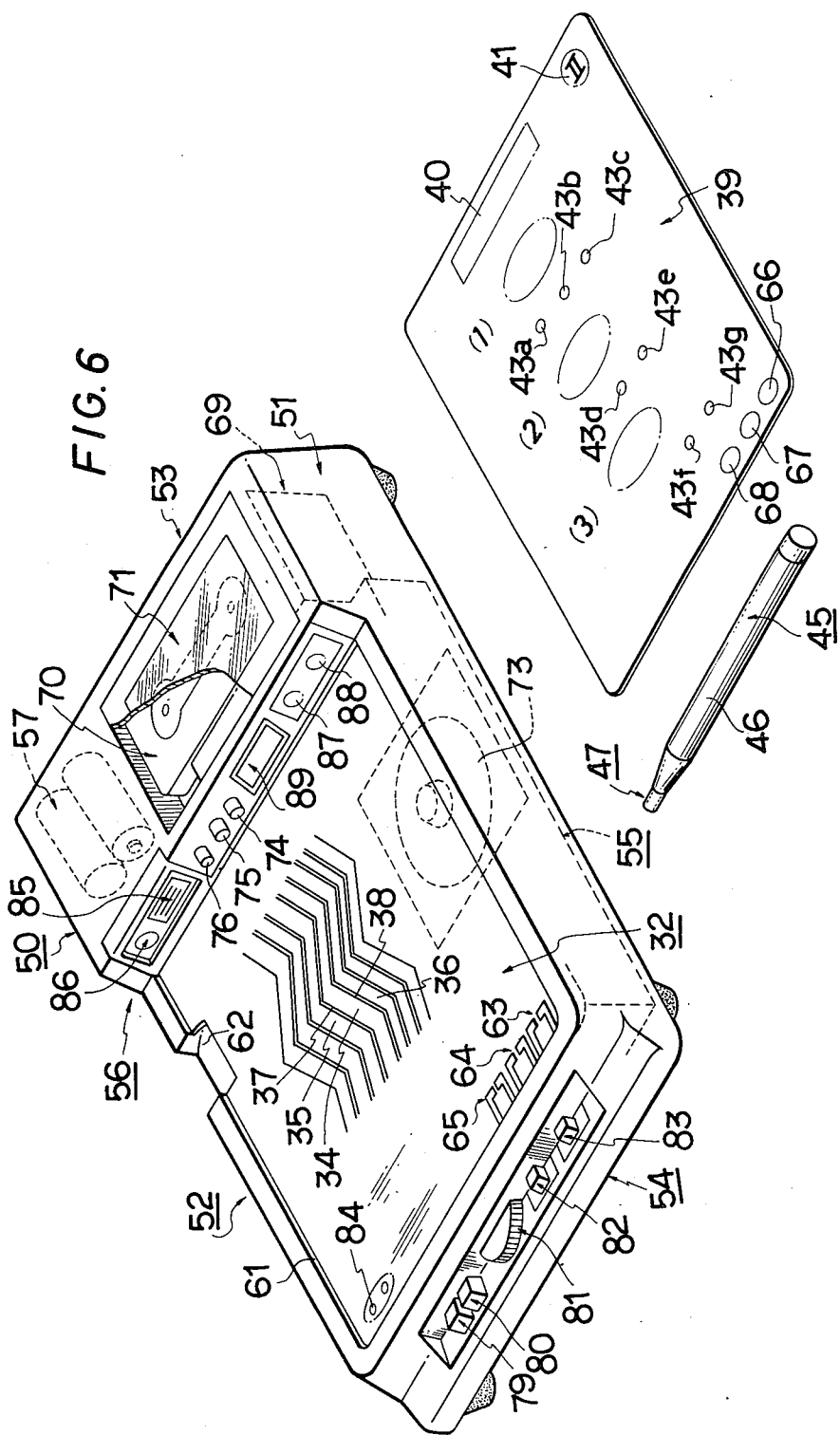
FIG. 6 is a perspective view of an embodiment of a learning device in which a hearing teaching material is combined with a sight teaching material according to the invention.

FIG. 6 shows an embodiment of a learning device wherein a hearing teaching material is combined with a sight teaching material. A learning device 50 has a learning reactor part 52, tape recorder part 53, learning operation part 54, controlling circuit 55, indicating part 56 and current source part 57 in a device body 51.

Figure 7:
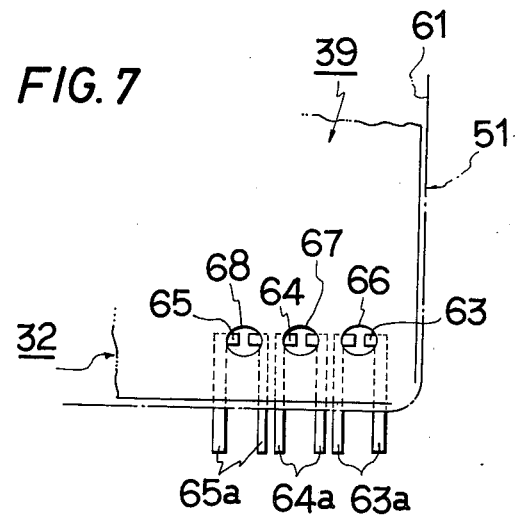
FIG. 7 is a plan view showing an embodiment of a controlling part formed on the learning sheet side of the FIG. 6 device.

Reactor part 52 is arranged in the front upper surface of body 51, and is fitted with plate 32 leaving a step part 61 on the periphery. On plate 32 a learning sheet 39 is properly positioned and mounted by utilizing step part 61. A finger catching notch 62 is formed by cutting a part of the step part 61 so that the learning sheet 39 may be easily mounted on and removed from plate 32. Not only is the formation of FIG. 2 made on plate 32, but also a starting conducting part 63, pausing conducting part 64 and, as required, a repeatedly reproducing conducting part 65, are formed in the right lower corner of plate 32. Conducting parts 63, 64 and 65 are exposed out of controlling holes 66, 67 and 68, respectively, formed to correspond respectively to them on the learning sheet, and are to be short-circuited by member 47 of answer indicating bar 45 in the described manner so that respective inputs may be made. Terminals 63a 64a and 65a (FIG. 7) are connected to corresponding circuits, respectively, of controlling circuits part 55.

Starting conducting part 63 is an input terminal to re-start for the next set question the tape recorder pausing after setting a question as described below. Pausing conducting part 64 is an input terminal to make the tape recorder pause while setting the question for any reason. Repeatedly reproducing conducting part 65 is an input terminal, to make it unnecessary to make a rewinding or the like, connected to the tape recorder in learning a typical pronunciation by reproducing and comparing it in case the typical pronunciation obtained from the tape recorder is heard, and then the pronunciation of the learner himself is successively recorded, e.g., when learning a foreign language.

Tape recorder part 53 is arranged in the rear portion of body 51 together with current source part 57, and consists of a cassette tape recorder capable of making sound recording and reproducing operations. It includes an ordinary driving mechanism and its controlling circuit 55, and has a recorder circuit 69 connected with controlling circuit 55. A cassette tape 70 is held by a tape holder 71 which is also an upper lid free to open and close, and is so made as to be able to be set on a magnetic head 72 (FIG. 2). Sound issues from a built-in speaker 73 on the bottom surface of the body. A fast feed button 74, rewind button 75 and tape eject button 76 are provided.

Figure 8:
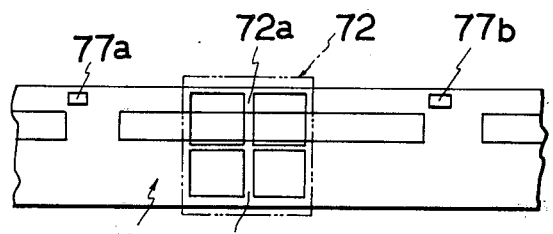
FIGS. 8 and 9 are explanatory views showing respective using manners of sound recording surfaces of magnetic tapes of the FIG. 6 device.
Figure 9:
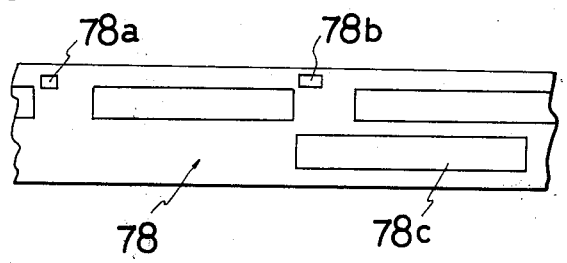

The wound recording arrangement shown in FIGS. 8 And 9 is used for cassette tape 70. Magnetic tape 77 shown in FIG. 8 is solely for setting questions. A track 77a for setting each question and a controlling track 77b to be attached to the end of question setting track 77a are set on the sound recording surface.

The magnetic tape 78 shown in FIG. 9 is made to be able to record and reproduce the pronunciation of the learner when used, for example, for pronunciation learning. A sound issuing track 78a containing a typical pronunciation, a controlling track 78b at the end of this sound issuing track, and a sound recording track containing the pronunciation of the learner, are set on the sound recording surface.

Magnetic head 72 is required to be a head of two shielded layers as used in a stereo device. The track 77a, 77b and 78a, 78b sides may be made only to reproduce sound in the circuits.

The learning operation part 54 is arranged in the front surface portion of device body 51, has a current source switch 79, tape recorder starting switch 80, sound volume adjusting knob 81, automatic stopping switch 82, and sound recording and reproducing switching switch 83, and also an earphone jack 84 on the side. These are connected respectively to the corresponding circuits of the above-mentioned controlling circuits part 55.

Current source switch 79 is used to open and close the current source for the entire device. Tape recorder starting switch 80 is used to start the tape recorder part 53. Both switches 79 and 80 are thus provided because sometimes the tape recorder is not used.

Automatic stopping switch 82 is a switch made to switch the three steps of a position of an automatic stop release, a position of an automatic stopping operation having a time limit, and a position of an automatic stopping operation having no time limit. In the automatic stopping position having a time limit, the reproduction of the question setting track 77a of tape 77 is finished, the automatic stop is made by a single obtained from controlling track 77b and then the thinking time is limited to be, e.g., less than one minute to set the next question. A timer circuit for setting the time is incorporated in the circuit. In the automatic stopping position having no time limit, the start of setting the next question after the above-mentioned automatic stop is made by short-circuiting the starting conducting part 63 on plate 32. Therefore, the thinking time for the set question is limited and is applied to the learner so that he may answer within the limited time and may learn by freely taking the thinking time.

Sound recording and reproducing switching switch 83 is a switch made to switch the three steps of a reproducing position reproducing tracks 77a, 77b or 78a, 78b of tape 77 or 78, a sound recording and reproducing position recording and reproducing the pronunciation of the learner following the typical pronunciation by using tape 78, and an ordinary sound recording position recording any sound. In the sound recording and reproducing position, an operation generally called an L.L. learning is made. The typical pronunciation is reproduced from the sound issuing track 78a by the upper head 72a of magnetic head 72. Then the sound reproducing circuit of upper head 72a is switched over to the sound recording circuit of the lower head 72b by a signal from controlling track 78b. The practiced pronunciation of the learner is recorded on the sound recording track 78c from the microphone 85 following the typical pronunciation. The end of the pronunciation is detected and the operation is stopped. Next, when the learner short-circuits the repeatedly reproducing conducting part 65 on plate 32, the circuit will again be switched over to the reproducing circuit of the upper head 72a. At the same time, the tape will be automatically rewound. The previous controlling track will be detected through the detection of the controlling track 78b, and the operation will stop. This stopping position corresponds to the starting position of the sound issuing track 78a. In this position, the operation will stop and then the reproduction of the sound issuing track 78a, the switching of the reproducing circuit to lower head 72b by the signal of controlling track 78b, and the reproduction of the pronunciation of the learner of the sound recording track 78c, will again be successively made. Therefore, the pronunciation practice can be made freely by using the learning sheet as a sight teaching material, and the typical pronunciation as a hearing teaching material.

Indicating part 56 is provided with a right and wrong reaction indicating lamp 86 for judging and indicating with a right and wrong reaction detecting circuit a signal obtained by short-circuiting the respective conducting bands 34, 35 and 36. A current source indicating lamp 87, automatic stop indicating lamp 88, and a point number indicating counter 89 are also provided.

The right and wrong reaction indicating lamp 86 consists of a blue light issuing diode connected substantially to the right answer circuit, and a red light issuing diode connected to the wrong answer circuit. An oscillator in each circuit and an interrupter on the wrong answer circuit side are parallelly provided so that, when a right answer is made, the blue light issuing diode is continuously lit. At the same time, a continuous sound issues from speaker 73. When a wrong answer is made, the red light issuing diode is intermittently lit and, at the same time, an intermittent sound issues from speaker 73.

Automatic stop indicating lamp 88 is lit when the reproduction of track 77a or 78a with cassette tape 70 is finished and the automatic stop is made.

Point number indicating counter 89 indicates the results of the grading by indicating the number of right answers and the number of wrong answers after one learning unit is finished.

Therefore, in this point number indicating counter, the result of learning each learning unit can be simply obtained.

We claim:

1. A learning device comprising:
   a learning reactor having a plurality of substantially parallel conducting bands arranged on a base plate;
   a right answer insulating part and a wrong answer insulating part formed between associated bands of said conducting bands;
   a learning sheet positioned and mounted on said base plate and on which a plurality of answer holes are provided for each set question to be presented so that a right answer corresponds to said right answer insulating part and a wrong answer corresponds to said wrong answer insulating part;
   an answer indicating bar provided with a conductor for short-circuiting a selected one of said insulating parts through said answer holes; and
   said plurality of conducting bands being tortuous and arranged in a series of continuously repeated regular patterns so that said continuously repeated regular patterns are camouflaged.

2. A device according to claim 1, wherein:
   said plurality of conducting bands are arranged as zigzag bent and continued in a series so that the arranged patterns are camouflaged by the continued repeated patterns.

3. A device according to claim 2, including:
   a separate conducting band of the same shape arranged in the blank part of the zigzag patterns consisting of said plurality of conducting bands.

4. A device according to claim 3, wherein:
   said conductor of said answer indicating bar is formed of a flexible and elastic conductive material.

5. A device according to claim 4, wherein:
   said conductor is formed of a flexible and elastic supporting piece having a conducting layer formed on its tip surface.

6. A device according to claim 4, wherein:
   said conductor is formed of a flexible and elastic rubber or soft synthetic resin made to contain carbon.

7. A device according to claim 6, including:
   a tape recorder incorporated in said learning reactor;
   a controlling conducting part for driving and controlling said tape recorder separately arranged on said base plate; and
   said learning sheet being provided with a controlling hole coinciding with said controlling conducting part so that said tape recorder may be driven and controlled by short-circuiting said controlling conducting part through said conductor of said answer indicating bar and a hearing teaching material with said tape recorder can be operatively connected with a sight teaching material with said learning sheet.

8. A device according to claim 7, wherein:
   a track for each set question, and a controlling track at the end of said set question track are set on the sound recording surface of a tape of said tape recorder so that an automatic stop can be made for each set question by a signal obtained from said controlling track.

9. A device according to claim 8, including:
   a timer circuit interposed in said driving circuit for said tape recorder so that said automatic stop is made and then, after a set time, the next set question can be started.

10. A device according to claim 8, wherein:
    a starting conducting part is provided as said controlling conducting part so that, by short-circuiting said starting conducting part, said automatically stopping tape recorder is restarted and the next set question is obtained.

11. A device according to claim 7, wherein:
    a pausing conducting part is provided as said controlling conducting part so that the drive of said tape recorder can pause.

12. A device according to claim 7, wherein:
    a sound issuing track containing each typical pronunciation, a controlling track at the end of said sound issuing track and a sound recording track parallel with both of said tracks are set on the sound recording surface of the tape of said tape recorder and a reproducing circuit is switched over to the sound recording circuit for said sound recording track by a signal obtained from said controlling track following a typical pronunciation obtained by reproducing said sound issuing track so that the pronunciation practice of the learner can be recorded on said sound recording track.

13. A device according to claim 12, wherein:
    a repeatedly reproducing conducting part is provided as said controlling conducting part and, by short-circuiting said repeatedly reproducing conducting part, the sound recording track containing said pronunciation practice is rewound together with the typical pronunciation track corresponding to it and both tracks are continuously reproduced so that both pronunciations can be compared with each other.

* * * * *